(12) United States Patent
Coburn et al.

(10) Patent No.: US 11,117,534 B2
(45) Date of Patent: Sep. 14, 2021

(54) PRE-ENTRY AUTO-ADJUSTMENT OF VEHICLE SETTINGS

(71) Applicant: Faraday&Future Inc., Gardena, CA (US)

(72) Inventors: Matthew Joseph Coburn, Milford, MI (US); Nicholas William Dazé, Los Angeles, CA (US); Charles Edward Spencer, Long Beach, CA (US)

(73) Assignee: Faraday&Future Inc., Gardena, CA (US)

( * ) Notice: Subject to any disclaimer, the term of this patent is extended or adjusted under 35 U.S.C. 154(b) by 600 days.

(21) Appl. No.: 15/756,571

(22) PCT Filed: Aug. 30, 2016

(86) PCT No.: PCT/US2016/049432
§ 371 (c)(1),
(2) Date: Feb. 28, 2018

(87) PCT Pub. No.: WO2017/040494
PCT Pub. Date: Mar. 9, 2017

(65) Prior Publication Data
US 2018/0251085 A1 Sep. 6, 2018

Related U.S. Application Data

(63) Continuation-in-part of application No. 15/224,086, filed on Jul. 29, 2016, now abandoned.
(Continued)

(51) Int. Cl.
*B60R 16/037* (2006.01)
*H04W 4/44* (2018.01)
(Continued)

(52) U.S. Cl.
CPC ........ *B60R 16/037* (2013.01); *G06K 9/00288* (2013.01); *H04W 4/40* (2018.02);
(Continued)

(58) Field of Classification Search
CPC ........... B60R 16/037; B60R 2011/0028; B60R 11/04; B60R 25/25; B60R 21/01536;
(Continued)

(56) References Cited

U.S. PATENT DOCUMENTS 6,830,123 B2    12/2004  Ohki et al.
6,860,508 B2 *   3/2005  Keutz .................... B60R 11/04
                                                    280/728.3
(Continued)

FOREIGN PATENT DOCUMENTS

DE    102011117499 A1    5/2012
DE    102013006087 A1    1/2014
(Continued)

OTHER PUBLICATIONS

International Search Report dated Nov. 17, 2015 for International Application No. PCT/US2016/049432.
(Continued)

*Primary Examiner* — Luis A Martinez Borrero
(74) *Attorney, Agent, or Firm* — Veros Legal Solutions LLP (57) ABSTRACT

A system for adjusting at least one adjustable component (30, 32, 34, 36, 38) of a vehicle (10) is disclosed. The system may include an exterior sensor (44) configured to generate a signal indicative of an identity a user before the user enters the vehicle (10), and a controller (60) in communication with the exterior sensor (44) and an actuator (40) configured to adjust the at least one adjustable component (30, 32, 34, 36, 38). The controller (60) may be configured to automatically cause the actuator (40) to adjust the at least one
(Continued)

adjustable component (30, 32, 34, 36, 38) responsive to the signal.

20 Claims, 5 Drawing Sheets

Related U.S. Application Data (60) Provisional application No. 62/211,983, filed on Aug. 31, 2015.

(51) Int. Cl.
*G06K 9/00* (2006.01)
*H04W 4/40* (2018.01)
*B60W 40/08* (2012.01)

(52) U.S. Cl.
CPC .............. *H04W 4/44* (2018.02); *B60W 40/08* (2013.01); *B60W 2040/0809* (2013.01); *B60W 2040/0881* (2013.01); *G06K 9/00892* (2013.01)

(58) Field of Classification Search
CPC . B60R 21/203; B60R 21/01542; B60R 22/26; B60R 21/015; B60R 11/02; B60R 11/0252; B60R 2011/0054; H04W 4/46; H04W 4/40; H04W 4/38; H04W 4/48; H04W 4/44; G06K 9/00288; B60N 2/2821; B60N 2/2875; B60N 2205/30; B60N 2/2809; B60N 2/508
See application file for complete search history.

(56) References Cited

U.S. PATENT DOCUMENTS

| | | | |
|---|---|---|---|
| 6,948,693 B2* | 9/2005 | Goodbred | B60N 2/0232 248/424 |
| 7,164,117 B2* | 1/2007 | Breed | B60R 21/01516 250/208.1 |
| 7,170,400 B2* | 1/2007 | Cowelchuk | B60Q 5/00 340/4.3 |
| 7,228,213 B2* | 6/2007 | Sakai | B60K 28/00 701/49 |
| 7,602,947 B1 | 10/2009 | Lemelson | |
| 7,864,029 B2* | 1/2011 | Huang | B60R 25/2081 340/426.1 |
| 8,880,291 B2 | 11/2014 | Hampiholi | |
| 8,918,231 B2* | 12/2014 | Rovik | B60R 25/01 701/2 |
| 8,988,188 B2 | 3/2015 | Chang | |
| 9,085,269 B2 | 7/2015 | Abuelsaad | |
| 9,272,689 B2* | 3/2016 | Fung | B60R 99/00 |
| 9,358,940 B2* | 6/2016 | Cooper | E05F 15/77 |
| 9,488,982 B2 | 11/2016 | Gurin | |
| 9,511,683 B2* | 12/2016 | Sala | B60N 2/002 |
| 9,563,998 B2 | 2/2017 | Hoyos et al. | |
| 9,646,436 B1* | 5/2017 | Campbell | G07C 9/00309 |
| 9,707,911 B1 | 7/2017 | Myres | |
| 9,707,913 B1 | 7/2017 | Ochiai et al. | |
| 9,783,162 B2 | 10/2017 | Hoyos et al. | |
| 9,952,600 B2 | 4/2018 | Gurin et al. | |
| 10,369,966 B1* | 8/2019 | Higgins | H04W 12/06 |
| 10,693,872 B1* | 6/2020 | Larson | H04L 9/3228 |
| 2003/0067148 A1* | 4/2003 | Keutz | B60R 25/04 280/731 |
| 2005/0035261 A1* | 2/2005 | Goodbred | B60N 2/067 248/429 |
| 2005/0140127 A1* | 6/2005 | Nakajima | B60R 21/01552 280/731 |
| 2005/0237150 A1 | 10/2005 | Sun et al. | |
| 2005/0283293 A1 | 12/2005 | Durach et al. | |
| 2006/0041359 A1 | 2/2006 | Ohtsubo et al. | |
| 2006/0208169 A1* | 9/2006 | Breed | G06K 9/00624 250/221 |
| 2006/0293892 A1 | 12/2006 | Pathuel et al. | |
| 2008/0136625 A1* | 6/2008 | Chew | G01V 5/0008 340/540 |
| 2009/0055178 A1* | 2/2009 | Coon | G10L 17/00 704/246 |
| 2009/0284359 A1* | 11/2009 | Huang | B60R 25/24 340/426.1 |
| 2010/0087987 A1 | 4/2010 | Huang et al. | |
| 2011/0237186 A1* | 9/2011 | Preissinger | B60R 16/037 455/41.1 |
| 2012/0053793 A1* | 3/2012 | Sala | B60N 2/002 701/45 |
| 2012/0208519 A1* | 8/2012 | Seaver | B60R 25/24 455/420 |
| 2013/0297099 A1* | 11/2013 | Rovik | B60R 16/037 701/2 |
| 2014/0222298 A1 | 8/2014 | Gurin | |
| 2014/0293753 A1* | 10/2014 | Pearson | G08C 23/02 367/197 |
| 2014/0309790 A1 | 10/2014 | Ricci et al. | |
| 2014/0309862 A1* | 10/2014 | Ricci | B60W 40/09 701/36 |
| 2014/0319895 A1* | 10/2014 | Lange-Mao | B60R 21/015 297/463.1 |
| 2014/0343796 A1* | 11/2014 | Abuelsaad | B60R 16/037 701/45 |
| 2015/0088337 A1* | 3/2015 | Toohy | B60W 50/0098 701/1 |
| 2015/0094881 A1* | 4/2015 | Rovik | B60R 16/037 701/2 |
| 2015/0148989 A1 | 5/2015 | Cooper et al. | |
| 2015/0149042 A1* | 5/2015 | Cooper | H04W 4/48 701/48 |
| 2015/0210237 A1* | 7/2015 | Peterson | B60R 21/01538 701/45 |
| 2015/0210287 A1* | 7/2015 | Penilla | G06F 3/04842 701/49 |
| 2015/0363986 A1 | 12/2015 | Hoyos et al. | |
| 2015/0370253 A1 | 12/2015 | Gurin | |
| 2017/0032114 A1 | 2/2017 | Turgeman | |
| 2017/0045890 A1 | 2/2017 | Gurin et al. | |
| 2017/0101032 A1 | 4/2017 | Sugioka et al. | |
| 2017/0264608 A1 | 9/2017 | Moore | |
| 2018/0029548 A1* | 2/2018 | Coburn | B60R 16/037 |

FOREIGN PATENT DOCUMENTS

| | | |
|---|---|---|
| DE | 102012223415 A1 | 6/2014 |
| EP | 2871866 A1 | 5/2015 |
| EP | 2625061 | 2/2017 |

OTHER PUBLICATIONS

Non-Final Office Action dated Nov. 2, 2017 in U.S. Appl. No. 15/224,086, 18 pages.
Final Office Action dated Aug. 7, 2018 in U.S. Appl. No. 15/224,086, 19 pages.

* cited by examiner

FIG. 5

PRE-ENTRY AUTO-ADJUSTMENT OF VEHICLE SETTINGS

RELATED APPLICATIONS

This application is a National Phase application under 35 U.S.C. § 371 of International Application No. PCT/US2016/049432 filed on Aug. 30, 2016, which is a Continuation-In-Part of U.S. Non-Provisional application Ser. No. 15/224,086 filed on Jul. 29, 2016 and is based on and claims priority to U.S. Provisional Application No. 62/211,983 filed on Aug. 31, 2015, the contents of all of which are expressly incorporated herein by reference.

TECHNICAL FIELD

The present disclosure relates generally to adjustment of vehicle setting, and more particularly, to a pre-entry auto-adjustment of vehicle settings.

BACKGROUND

Modern vehicles can be adjusted in many different ways to accommodate occupants of different sizes and preferences. For example, a seat can be raised or lowered, shifted forward or rearward, tilted fore or aft, lumbar-adjusted, and/or heated or cooled. In addition, a steering wheel can be moved in or out, and tilted up or down. Mirrors inside and outside of the vehicle can be tilted, shifted, and/or rotated. Displays can be moved, tilted, and/or have their appearances changed. Airbags can be adjusted to have a greater or lesser deployment force.

Some of these adjustments can be power-assisted based on occupant input. For example, one or more actuators can be associated with the seat, the steering wheel, the mirrors, and/or the display, and selectively activated (e.g., via buttons, switches, and/or dials) to make the adjustments. In some instances, however, multiple different occupants may use a common vehicle. In these instances, each occupant may need to provide the inputs before the adjustments can be made and the vehicle can be driven in a comfortable manner. Providing the input each time a user operates the vehicle can be cumbersome and time consuming. In addition, it may be difficult in some situations to make the right adjustments for each occupant. Further, some adjustments, for example airbag adjustments, may not be manually adjustable.

Systems exist that identify occupants inside the vehicle and responsively make automated adjustments to vehicle components. For example, a size and/or location of an occupant inside the vehicle may be detected (e.g., via a camera), and thereafter the adjustments may be made according to pre-established and/or recommended settings. Unfortunately, these adjustments are only made after the occupant is already inside the vehicle, which can make entry into the vehicle difficult and/or uncomfortable for some occupants. In addition, by waiting to make the adjustments until after the occupant is inside the vehicle, operation of the vehicle may be delayed by the time required for the adjustments to occur. Further, when an occupant makes refinements to some component adjustments (e.g., the seat and/or the steering wheel), other associated adjustments (e.g., to the airbag) may not be automatically changed to account for the refinements.

The disclosed vehicle system is directed to mitigating or overcoming one or more of the problems set forth above and/or other problems in the prior art.

SUMMARY

One aspect of the present disclosure is directed to a system for adjusting at least one adjustable component of a vehicle. The system may include an exterior sensor configured to generate a signal indicative of an identity of a user before entry of the user into the vehicle, and a controller in communication with the sensor and an actuator configured to adjust the at least one adjustable component. The controller may be configured to automatically cause the actuator to adjust the at least one adjustable component responsive to the signal.

Another aspect of the present disclosure is directed to a method of adjusting a component of a vehicle. The method may include detecting an identity of a user before the user enters the vehicle. The method may also include automatically adjusting the component responsive to the identity.

Yet another aspect of the present disclosure is directed to a vehicle. The vehicle may include a seat, a steering wheel, and an airbag. The vehicle may also include an exterior sensor configured to generate a signal indicative of an identity of a user before entry of the user into the vehicle, an interior sensor configured to measure at least one of a distance between an occupant and the airbag and the occupant and the seat, and a controller in communication with the seat, the steering wheel, the exterior sensor, and the interior sensor. The controller may be configured to determine, based on the signal, that the identity of the user matches a known identity stored in memory, and to selectively recall a first set of adjustments corresponding to the known identity. The controller may also be configured to determine, based on the signal, biometrics of the user when the identity of the user does not match the known identity, and to determine a second set of adjustments to accommodate the biometrics of the user. The controller may be further configured to automatically adjust at least one of the steering wheel, the seat, and the airbag to achieve the first or second sets of adjustments. The controller may be further configured to receive input indicative of a manual refinement of adjustments made by the controller to the seat or the steering wheel, and to automatically adjust the airbag setting based on the manual refinement.

DETAILED DESCRIPTION

The disclosure is generally directed to a system that adjusts user settings (e.g., a seat position, a steering wheel position, an airbag setting, etc.) of a vehicle, before the user enters the vehicle. In particular, the disclosed system may be configured to identify the user as the user approaches the vehicle. When the identity of the user matches a known identity of a previous user, vehicle settings previously employed by the user may be selected for current use. In one embodiment, the identity of the user is determined based on image data captured by an external camera. In particular, captured image data may be compared to stored image data of previous users to determine if the user has previously used the vehicle. In another embodiment, the system may detect a personal device of the user, and identify the user as either a previous user or a new user via data stored on the personal device. When the system determines that the user is new (e.g., when the user has not yet used the vehicle), the image data may be employed to determine optimal settings for the new user (e.g., based on biometrics of the new user).

Figure 1:
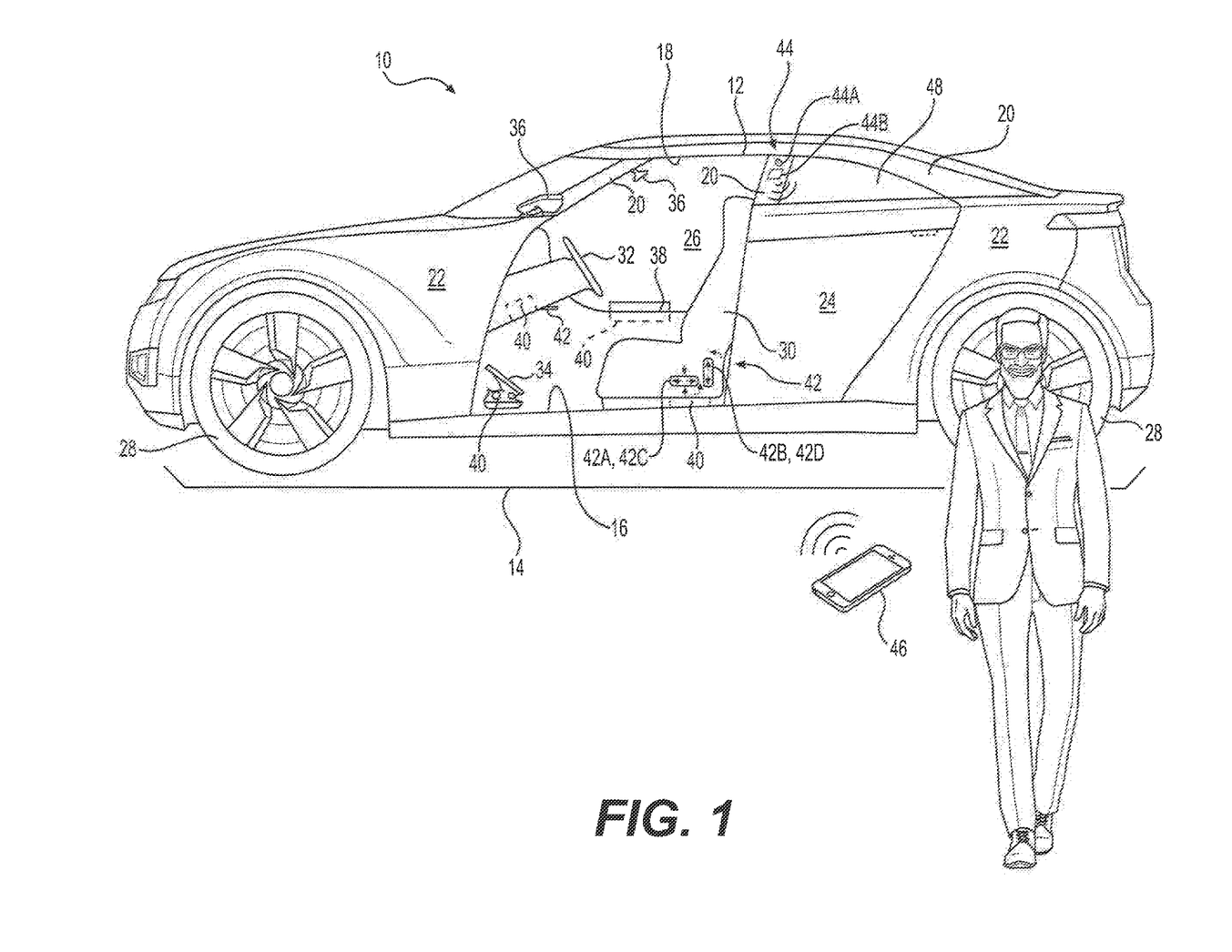
FIG. 1 is a perspective illustration of an exemplary vehicle.

FIG. 1 is a perspective illustration of an exemplary vehicle 10. Although vehicle 10 is shown as a car in FIG. 1, it is contemplated that vehicle 10 may alternatively be a pickup truck, a utility vehicle, a van, or have any other body style. It is further contemplated that vehicle 10 may be an electric vehicle, a fuel-cell vehicle, a conventional combustion-powered vehicle, or a combination thereof. Vehicle 10 may be manually operated, remotely controlled, and/or autonomously operated.

Vehicle 10 may include a body 12 operatively connected to and supported by a rolling chassis 14. Body 12 may include a floor 16, a roof 18, and plurality of posts 20 that extend between floor 16 and roof 18. One or more body panels 22 and/or doors 24 may be connected between floor 16, roof 18, and/or posts 20 to at least partially enclose a user area 26 inside of body 12.

Any number of user-adjustable devices may be provided inside user area 26 of body 12 or external of body 12 for use in controlling different functions of vehicle 10 or providing information to the user. These devices may include, among other things, a seat 30, a steering wheel 32, one or more pedals (e.g., an accelerator pedal, a brake pedal, a clutch pedal, etc.) 34, one or more mirrors (e.g., a driver-side mirror, a passenger-side mirror, a rear-view mirror, etc.) 36, and one or more displays (e.g., a center-console display, an instrument cluster, a heads-up display, etc.) 38. Each of these components may be provided with an actuator 40, which can be selectively energized to cause a corresponding adjustment of the associated component. Actuator 40 may embody, for instance, an electric motor, a hydraulic cylinder, a pneumatic piston, a heater, a light source, or another device known in the art. For example, seat 30 may be raised, lowered, shifted, tilted, and/or otherwise adjusted when the corresponding actuator 40 is energized. Adjustments to steering wheel 32, pedal(s) 34, mirror(s) 36, and/or display(s) 38 may be achieved in similar manner.

In some embodiments, the adjustments described above may be triggered based on user input. Specifically, one or more manually operated devices 42 may be associated with each of the user-adjustable components inside of user area 26 and, when manipulated, selectively energize the corresponding actuator 40. For example, seat 30 may be provided with a fore/aft switch 42a, a backrest tilt switch 42b, a height switch 42c, and/or a lumbar support switch 42d. Each of these devices 42 may be touched, pressed, pulled, twisted, or otherwise activated to generate corresponding signals that selectively energize particular actuators 40 of seat 30. Similar devices may be associated with a headrest of seat 30, steering wheel 32, pedal(s) 34, mirror(s) 36, and/or display(s) 38.

Vehicle 10 may include at least one sensor 44 configured to generate a signal indicative of an identity of a user before entry of the user into user area 26 (e.g., as the user approaches vehicle 10). In one example, sensor 44 is an optical sensor (e.g., a camera) 44a configured to generate image data associated with the user. In another example, sensor 44 is a radio receiver (e.g., a Blue Tooth receiver) 44b configured to retrieve (e.g., via a wireless network 45) identity data (e.g., a digital signature and/or certificate) stored on a personal device (e.g., an enabled cell phone, tablet, watch, or fob) 46 carried by the user. In some embodiments, vehicle 10 is equipped with both an optical sensor 44a and a radio receiver 44b. Sensor(s) 44 may be mounted externally (e.g., to one or more posts 20, body panels 22, and/or mirrors 36) or otherwise configured to obtain the image data and/or the identity data from the user before the user enters vehicle 10 (e.g., through a window 48).

Figure 2:
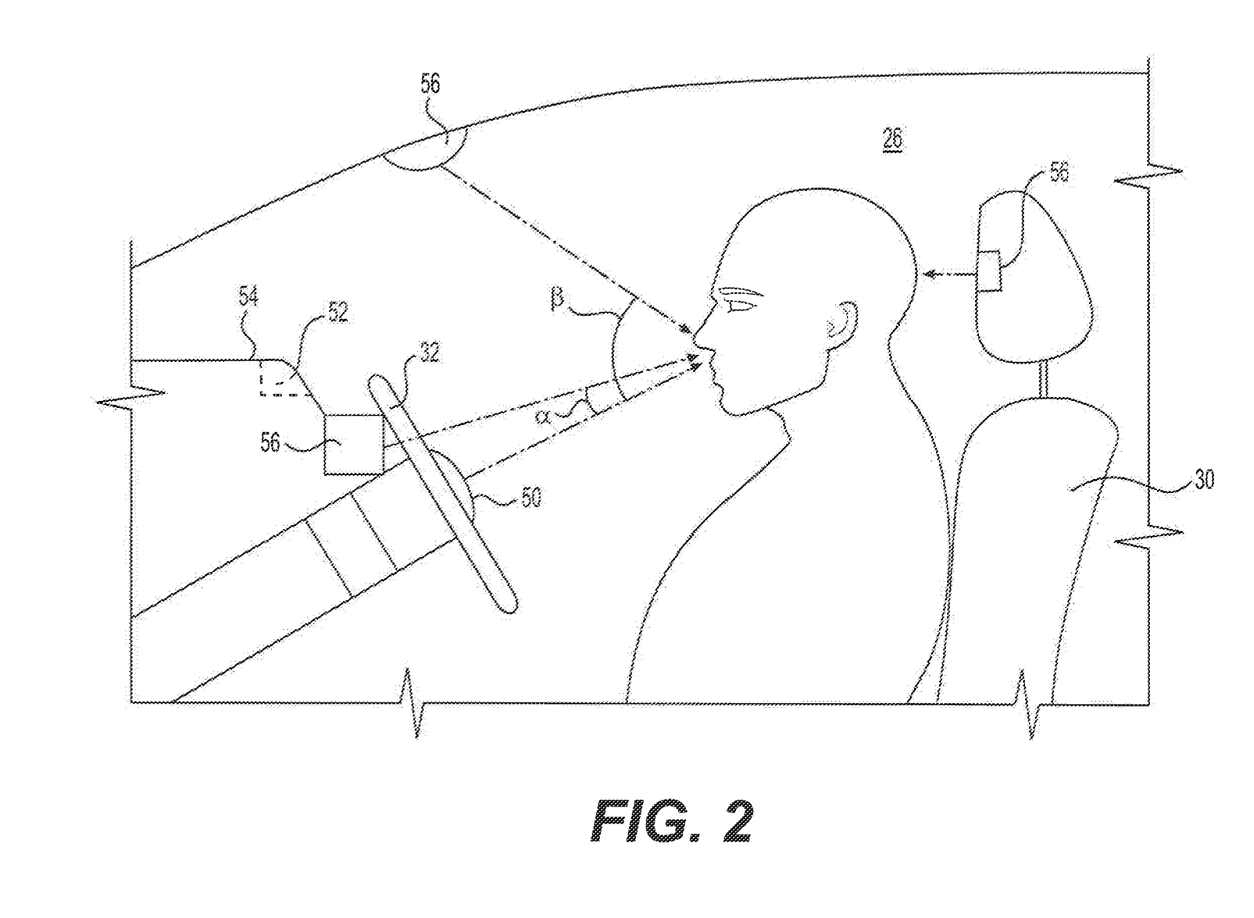
FIG. 2 is another perspective illustration of the exemplary vehicle of FIG. 1.

FIG. 2 is another perspective illustration of vehicle 10 illustrating additional adjustable components that may be positioned inside of user area 26. These additional adjustable components may include, among other things, one or more airbags configured to cushion occupants of vehicle 10. For example, a driver airbag 50 may be provided in proximity to a front-row driver seat 30, while a passenger airbag 52 may be provided in proximity to a front-row passenger seat (not shown). In this example, driver airbag 50 is associated with steering wheel 32 (e.g., recessed within a corresponding steering column), and passenger airbag 52 is associated with (e.g., recessed within) a glove-box and/or a dashboard 54. During deployment, each of driver and passenger airbags 50, 52 may fill with gases and expand in a direction toward the associated seats, such as seat 30.

One or both of driver and passenger airbags 50, 52 may be adjustable in the way that they deploy. In particular, a deployment force of one or both airbags 50, 52 may be selectively adjusted by changing an amount of inflation and/or a speed of inflation. For example, by reducing an amount of gases that fill the particular airbag and/or by reducing a fill rate of the airbag, the airbag may deploy with less force. The opposite may also be true. In some instances, airbag adjustments may relate to the seat and/or steering wheel adjustments described above. For example, in general, as a particular seat 30 (and a corresponding sitting position of the occupant) is adjusted to be closer to steering wheel 32 and/or dashboard 54, the corresponding airbag may be adjusted to deploy with less force. And likewise, as a particular seat 30 (and the corresponding sitting position of the occupant) is adjusted to be farther from steering wheel 32 and/or dashboard 54, the corresponding airbag may be adjusted to deploy with greater force. Similar adjustments may also be made based on an elevation of seat 30 (and corresponding height of the occupant) and/or an angle of seat 30 (and corresponding angle of the occupant).

One or more sensors and/or transducers (e.g., ultrasonic transceivers) 56 may be located inside of user area 26 and configured to measure a location of the front-seat occupants (e.g., the driver and/or the passenger) and/or their corresponding seats 30 relative to airbags 50, 52. Sensor(s) 56 may be positioned, for example, in steering wheel 32 (e.g., adjacent airbag 50), in dashboard 54, in seat 30 (e.g., in a headrest portion of seat 30), and/or elsewhere in user area 26. Each of sensors 56 may be configured to transmit and receive back an ultrasonic signal; and an elapsed period of time between signal transmission and receipt may then be correlated to the distance between the point of transmission at sensor 56 (e.g., adjacent airbags 50, 52) and a point of reflection (e.g., at the occupant or seat 30). For example, the elapsed period of time may be divided in two, to obtain a one-way transit time, and then multiplied by the speed of sound in air to obtain the relative distance. In some instances, an angle $\alpha$ or $\beta$ (depending on the location of sensor 56) between a direct line of site from sensor 56 to the occupant, and a direct line of site from the occupant to the corresponding airbag 50 or 52 may need to be accounted for when determining the distance from the occupant to the corresponding airbag 50 or 52. Sensor(s) 56 may be used in a similar manner to determine a location of the occupant relative to seat 30 (e.g., relative to the headrest portion of seat 30).

Figure 3:
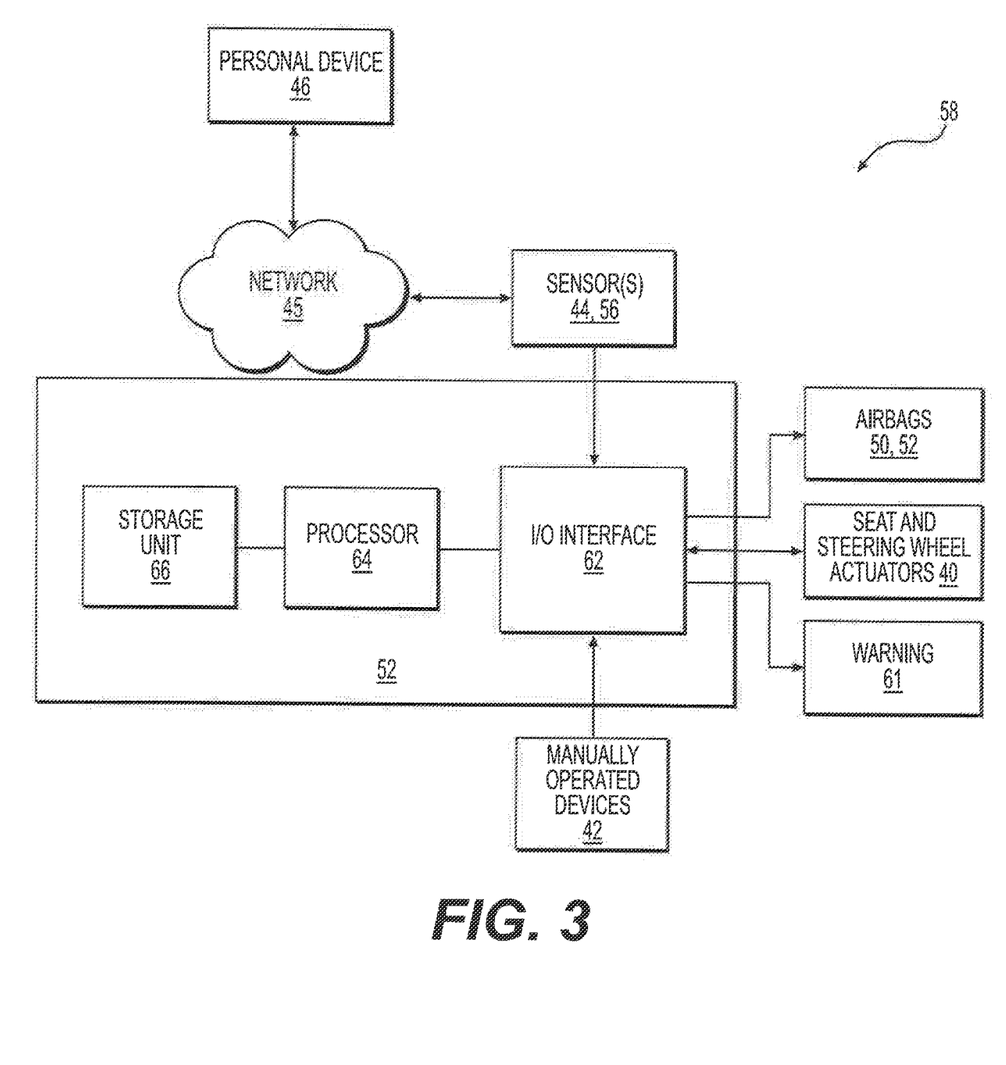
FIG. 3 is a diagrammatic illustration of an exemplary vehicle setting adjustment system that may be used with the vehicles of FIGS. 1 and 2.

FIG. 3 diagrammatically illustrates an exemplary vehicle setting adjustment system 58, which can be used to automatically make some or all of the adjustments described above, regardless of manual input being received via devices 42. System 58 may include actuator(s) 40, manually operated device(s) 42, sensors 44, 56, network 45, personal device 46, airbags 50 and 52, and a controller 60 in communication with each of the other components. In some embodiments, system 58 may also include a warning device 61 configured to visually (e.g., via display 38), audibly (e.g., via an existing entertainment system speaker—not shown) and/or tactily (e.g., via actuators 40 in seat 30 and/or steering wheel 32) generate warnings perceivable by the occupants of vehicle 10. Controller 60 may comprise, among other things, an I/O interface 62, a processor 64, and a storage unit 66. One or more of the components of controller 60 may be included in an on-board computer of vehicle 10, a remote server, or in the cloud. The components of system 58 may be configured to transfer data between each other and send or receive instructions.

I/O interface 62 may be configured for two-way communication between controller 60 and the various remaining components of system 58, such as actuator(s) 40, device(s) 42, sensors 44 and 56, personal device 46, and airbags 50 and 52. The communication may be facilitated via cables, network 45, or other communication mediums.

Processor 64 may include any appropriate type of general-purpose or special-purpose microprocessor, digital signal processor, or microcontroller. Processor 64 may be configured with virtual processing technologies, and use program logic to simultaneously execute and control any number of operations. For example, processor 64 may be configured to receive and process signals to determine appropriate adjustments that should be made to the adjustable components of vehicle 10 based on a determined identity and/or measured biometrics of a user of vehicle 10. Processor 64 may also be configured to implement virtual machine or other known technologies to execute, control, run, manipulate, and store any number of software modules, applications, programs, etc. For example, processor 64 may be configured to generate and transmit command signals, via I/O interface 62, in order to energize actuators 40 and/or to make corresponding adjustments to the operation of airbags 50 and 52.

Storage unit 66 may include a volatile or non-volatile, magnetic, semiconductor, tape, optical, removable, non-removable, or other type of tangible and/or non-transitory computer-readable medium that stores one or more computer programs and data. The computer programs may be executable by controller 60 to perform specialized functions of system 58. For example, storage unit 66 may be configured to store software for biometric detection of users, such as body scanning, facial recognition, iris scanning, and/or voice recognition. In addition, sensor(s) 44 and/or 56 may benefit from the use of processing software, (e.g., image recognition software and/or video processing software), which can be stored within storage unit 66. Using this software, sensor(s) 44 may be employed by controller 60 to distinguish a person from inanimate objects, and to distinguish identities, facial features, and/or other biometric aspects of users. Similarly, sensor(s) 56 may be employed to detect actual locations of portions of an occupant (e.g., a torso, a head, etc.) relative to other features of vehicle 10 (e.g., the head rest, airbags 50 and 52, etc.). Storage unit 66 may also be configured to store profiles of previous users of vehicle 10, such as names, digital signatures, certificates of authorization, settings of adjustable components, user biometrics, and other information. In some embodiments, after being paired a first time with personal device 46, processor 64 (e.g., using software recalled from storage unit 66) may be configured to thereafter recognize personal device 46 based on corresponding data (the digital signature and/or authorization certificate emitted by personal device 46) recorded into storage unit 66 during pairing.

The computer programs may also include operating systems (not shown) that perform known functions when executed by processor 64. By way of example, the operating systems may include Microsoft Windows™, Unix™, Linux™, iOS™ operating systems. Android operating systems, such as Microsoft CE™, or other types of operating systems. Storage unit 66 may also include communication software that, when executed by processor 64, facilitates communications via network 45, such as Web browser software, tablet software, and/or smart handheld device networking software, etc.

Figure 4:
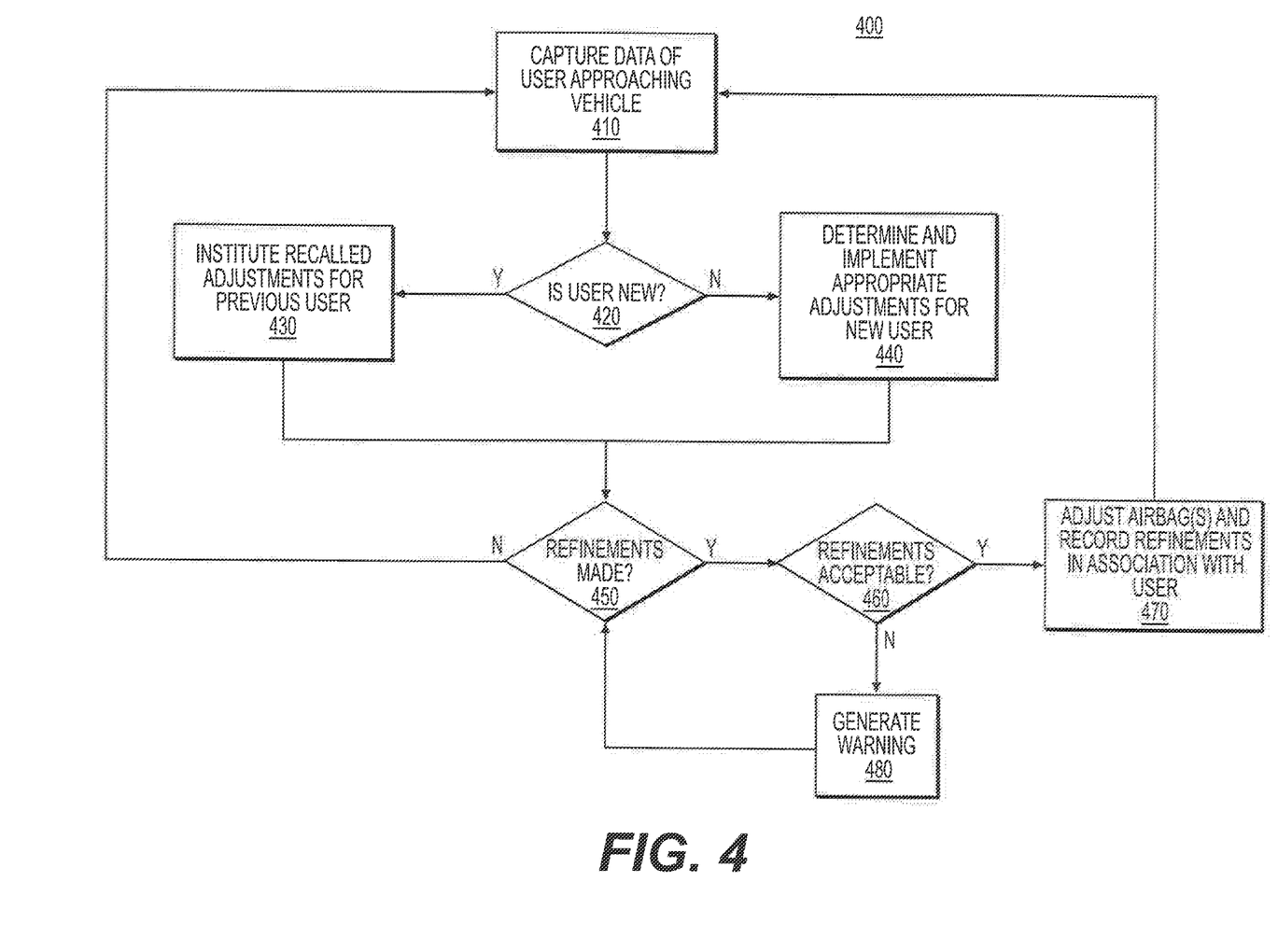
FIG. 4 is a flowchart illustrating an exemplary method that may be performed by the system of FIG. 3.

An exemplary method of operation 400 that can be implemented by system 58 is illustrated in the flowchart of FIG. 4. As shown in this figure, method 400 may begin with the capturing of user data before the user enters vehicle 10 (e.g., as the user approaches vehicle 10) (Step 410).

The data-capturing step 410 may be performed in several different ways. For example, as the user moves into range of sensor 44a, image data associated with the user may be captured and transmitted as signals to processor 64 via I/O interface 62. Responsive to the signals from sensor 44a, processor 64 may compare the captured image data to stored image data associated with previous users of vehicle 10 to determine if the user is a new user (Step 420). When the captured image data substantially matches (e.g., matches within a threshold amount) the stored image data of a particular previous user (step 420:N), processor 64 may conclude that the user has previously operated vehicle 10. Otherwise, processor 64 may conclude that the user is a new user (step 420:Y). In another example, as the user moves into range of sensor 44b, a digital signature and/or certificate of authorization associated with the user may be received from personal device 46 (e.g., via network 45) and transmitted as signals to processor 64 via I/O interface 62. Responsive to the signals from sensor 44b, processor 64 may compare the digital signature and/or certificate of authorization to stored data associated with previous users of vehicle 10 to determine if the user is new or has previously operated vehicle 10. When the retrieved signature and/or certificate substantially matches (e.g., matches within a threshold amount) the stored signature and/or certificate of a particular previous user (step 420:N), processor 64 may conclude that the user has previously occupied vehicle 10 as a driver or a passenger. Otherwise, processor 64 may conclude that the user is a new user (step 420:Y).

When the user approaching vehicle 10 is determined to have previously operated vehicle 10, processor 64 may recall from storage unit 66 and institute (e.g., via corresponding commands directed to actuator(s) 40) a set of adjustments for one or more of the adjustable components that were previously made by the user or previously determined by controller 60 to be appropriate for the user (Step 430). For example, based on previous settings of the identified user, actuator(s) 40 may be energized to move seat 30 farther away from steering wheel 32 and/or dashboard 54 at step 430. At this same time (or shortly thereafter), a corresponding adjustment to airbag 50 and/or 52 may be made (e.g., based directly on the seat and/or steering wheel adjustments, based on known biometrics of the identified user, and/or based on signals generated by sensor(s) 56 during implementation of the seat and/or steering wheel adjustments) to increase a subsequent deployment force (i.e., a deployment force that could occur during a collision when user area 26 is occupied by the same user). In contrast, when seat 30 is moved closer to steering wheel 32 and/or dashboard 54, a corresponding adjustment may be made to decrease a future deployment force of airbag 50 and/or 52. In this manner, seat 30 and/or steering wheel 32 may be caused to return to particular configurations that were previously found by the user to be convenient and/or comfortable, and airbag settings may be adjusted to account for the seat and/or steering wheel adjustments. Similar adjustments to mirrors 36 and/or displays 38 may be made at step 430.

However, when the user approaching vehicle 10 is determined to be new (e.g., to not have operated vehicle 10 before or within a threshold period of time), processor 64 may determine and implement e.g., via corresponding commands directed to actuator(s) 40) a set of adjustments for seat 30 and/or steering wheel 32, as well as corresponding airbag adjustments) a set of adjustments for one or more of the adjustable components that should be appropriate for the new user (Step 440). This determination may be made, for example, based on reference to biometric information contained in the captured image data of stored biometric information and corresponding adjustments. In particular, from the captured image of the user, particular biometric information (e.g., overall height, torso length, leg length, arm reach, build, weight, gender, etc.) may be gleaned using corresponding biometric software. One or more parts of this information may then be compared to a table stored in memory to determine corresponding adjustments (e.g., adjustments to seat 30, steering wheel 32, airbags 50 and 52, etc.). For example, for a particular leg length, a fore/aft adjustment of seat 30 may be determined by processor 64, and corresponding commands may be directed to associated actuator(s) 40. Similarly, for a particular torso height, a height adjustment of seat 30 may be determined and commanded. Likewise, for a particular arm length, a tilt of seat 30 and/or a position or angle of steering wheel 32 may be determined and commanded. Related airbag adjustments may be made in the same way and/or responsive to the seat and/or steering wheel adjustments. Other adjustments (e.g., mirror and/or display adjustments) may be determined and then commanded in this same manner using the biometric information of the user.

After completion of step 430 or step 440, controller 60 may monitor input devices 42 to determine if the user makes any refinements to the adjustments (e.g., to the adjustments of seat 30 and/or steering wheel 32) (Step 450). In particular, it may be possible for the user to manipulate one or more of input devices 42 after controller 60 has adjusted the adjustable components in order to increase a convenience and/or comfort in accessing the adjustable components. In these instances, processor 64 may determine if the user-requested refinements are acceptable (Step 460). In particular, it may be possible for the user to request adjustments that are not appropriate for the biometrics of the user and that could result in injury during a collision. For example, it may be possible for the user to adjust the headrest portion of seat 30 to a location and/or angle that increases a likelihood of neck injury. The improper adjustment may be detected, for example, via a comparison of the signals from sensor(s) 56 with the biometric information of the user.

When the manual refinements detected at step 450 are determined at step 460 to be acceptable, processor 64 may make corresponding airbag adjustments (if necessary) and record the refinements in association with the identity of the user (Step 470), such that future adjustments made for the same user may include the refinements. Additionally, controller 60 may utilize refinements to the adjustments to optimize default settings for new users who have similar biometric data to the user who made the refinements to the adjustments. Method 400 may then return from step 470 to step 410 for repetition of method 400. If the manual refinements are not made after automated adjustment of the adjustable components (step 450:N), control may proceed from step 450 to step 410.

Returning to step 460, when processor 64 determines that the manual refinements detected at step 450 are not acceptable, processor 64 may generate a warning (e.g., by activating warning device 61) directed to the operator (Step 480). This warning may alert the user that the refinements requested by the user could result in increased risk to the user. Control may then return from step 480 to step 450, allowing the user to make further manual refinements that reduce the risk or to override system 58 (e.g., to not provide further refinements). In some situations, inappropriate refinements may not be allowed (e.g., the refinements may be ignored and/or prevented from being implemented).

Figure 5:
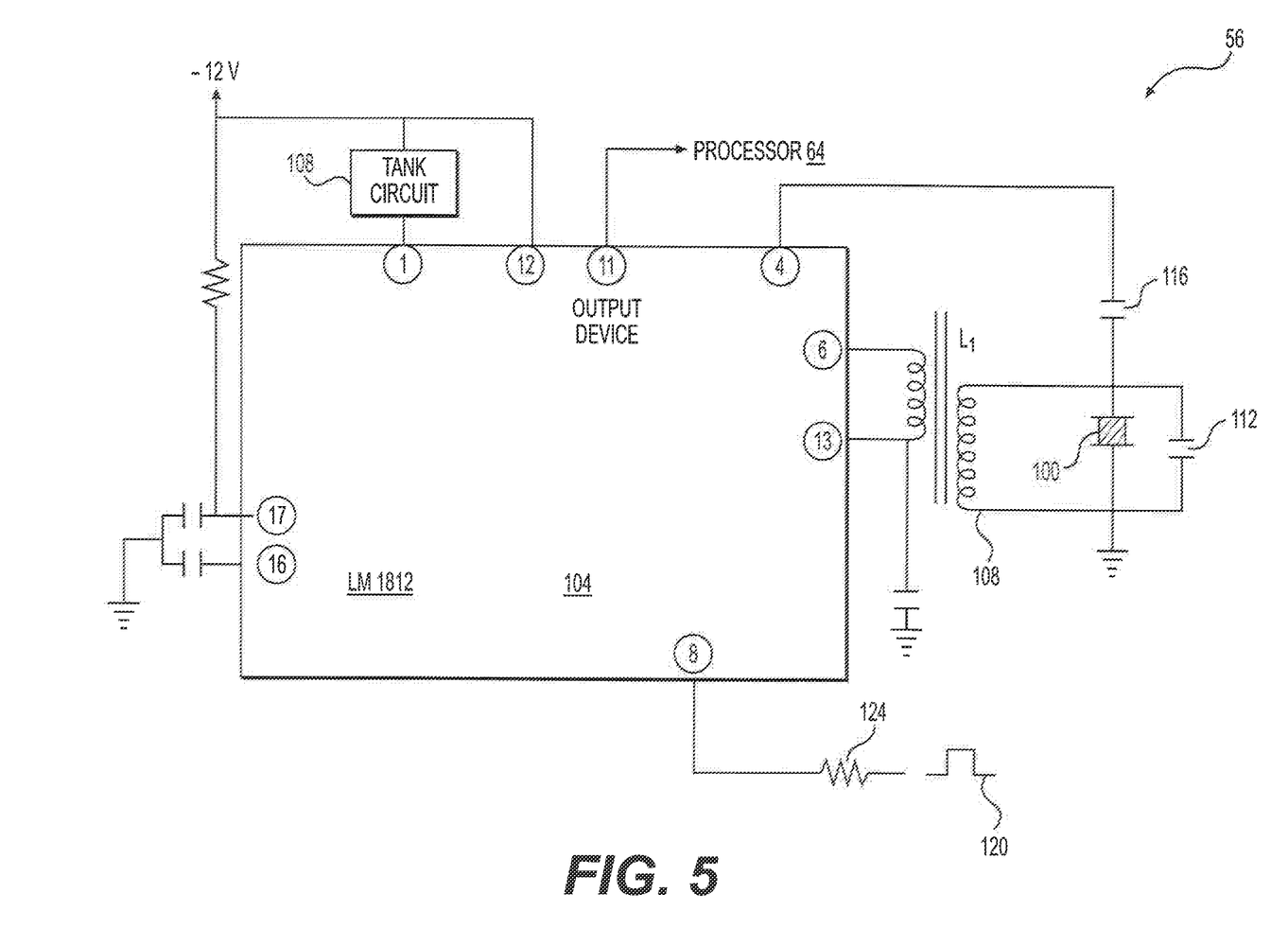
FIG. 5 is a schematic illustration of an exemplary disclosed sensor that may be used in conjunction with the system of FIG. 3.

FIG. 5 is an exemplary schematic illustration of sensor 56. As shown in FIG. 5, sensor 56 may include a crystal or piezo transducer 100 and a transceiver-integrated circuit 104. In one embodiment, the transceiver-integrated circuit is an LM1812 ultrasonic transceiver made by National Semiconductor, Arlington, Tex., 76017. The transceiver-integrated circuit is a 12V circuit capable of providing frequencies up to 325 kHz and one amp current to drive a peak load at 12 W.

Circuit 104 may be connected to a tank circuit 108 located between a 12V supply and a pin labeled as #1. Tank circuit 108 may generate an oscillation frequency for transducer 100. A pin labeled #6 may function as a transmitter output of transceiver 104, and be connected to one side of a coil $L_1$ to match transducer 100. An opposing side of coil $L_1$ 108 may be connected in parallel with transducer 100 and a capacitor 112. A pin labeled #4 may function as an input gain for circuit 104 and be connected to transducer 100 through a capacitor 116.

An input pulse 120 may provide input to transceiver 104 through a resistor 124 to a pin labeled #8. Input pulse 120 may trigger an output of transducer 100. A pin labeled #16 may produce an output pulse that is used to drive other electronics, in this embodiment, the output pulse is transmitted to processor 64 for determination of distances based on reflected transducer pulses.

It will be apparent to those skilled in the art that various modifications and variations can be made to the disclosed system, related method, and vehicle. Other embodiments will be apparent to those skilled in the art from consideration of the specification and practice of the disclosed system, related method, and vehicle. For example, in some cases, controller 60 may determine whether the user has operated another vehicle associated with the same network 45 as vehicle 10, and responsively load adjustments for the user based on the user's adjustments in the other vehicle.

It is intended that the specification and examples be considered as exemplary only, with a true scope being indicated by the following claims and their equivalents.

What is claimed is:

1. A system for adjusting at least one adjustable component of a vehicle, including:
   an airbag;
   an exterior sensor configured to generate a signal indicative of an identity of a user before the user enters the vehicle;
   a first interior sensor configured to measure a first distance between the first interior sensor and the user when the user is seated in the vehicle; and
   a controller in communication with the exterior sensor and an actuator configured to adjust the at least one adjustable component, the at least one adjustable component includes at least a seat, the controller being configured to
   automatically cause the actuator to adjust an elevation and an angle of the seat responsive to the signal;
   determine an angle between a first direct line between the first interior sensor and the user and a second direct line between the airbag and the user;
   determine a second distance between the airbag and the user using the first distance and the angle between the first direct line and the second direct line; and
   automatically adjust settings of the airbag based on the second distance, adjusted elevation and angle of the seat.

2. The system of claim 1, wherein the at least one adjustable component includes at least one of, a steering wheel, a pedal, a mirror, a display, and the airbag.

3. The system of claim 1, wherein the exterior sensor is a camera configured to capture an image of the user.

4. The system of claim 1, wherein the exterior sensor is a wireless receiver configured to communicate with a personal device carried by the user.

5. The system of claim 1, wherein the controller is further configured to: determine, based on the signal, that the identity of the user matches a known identity stored in memory; selectively recall a first set of adjustments corresponding to the known identity; and automatically cause the actuator to adjust the at least one adjustable component according to the first set of adjustments.

6. The system of claim 5, wherein the controller is further configured to: determine, based on the signal, that the identity of the user does not match a known identity; determine biometrics of the user; determine a second set of adjustments to accommodate the biometrics of the user; and automatically cause the actuator to adjust the at least one adjustable component according to the second set of adjustments.

7. The system of claim 1, wherein: the at least one adjustable component includes a steering wheel; the system further includes at least one input device movable by the user to make a refinement to adjustments automatically made by the controller.

8. The system of claim 7, wherein the controller is further configured to: determine, based on known biometrics of the user, if the refinement is acceptable; and selectively generate a warning indicating that the user should modify the refinement.

9. The system of claim 7, further including an interior sensor configured to measure a distance from the user to at least one of the at least one adjustable component and the airbag; and the controller is further configured to determine the settings of the airbag based on the distance.

10. The system of claim 1, wherein the at least one adjustable component includes an airbag in the vehicle, and the controller is further configured to automatically adjust a deployment force of the airbag responsive to the signal.

11. A method of adjusting at least one component of a vehicle, the at least one component comprising at least a seat and an airbag, the method including:
    detecting an identity of a user before the user enters the vehicle;
    automatically adjusting an elevation and an angle of the seat responsive to the identity;
    measuring a first distance between a first interior sensor and the user when the user is seated in the vehicle;
    determining an angle between a first direct line between the first interior sensor and the user and a second direct line between the airbag and the user;
    determining a second distance between the airbag and the user using the first distance and the angle between the first direct line and the second direct line;
    automatically adjusting settings of the airbag based on the second distance, adjusted elevation and angle of the seat.

12. The method of claim 11, wherein the component includes at least one of a seat, a steering wheel, a pedal, a mirror, and a display.

13. The method of claim 11, wherein detecting the identity of the user includes: capturing image data associated with the user; and comparing the image data to image data of known users stored in memory.

14. The method of claim 11, wherein detecting the identity of the user includes: wirelessly communicating with a personal device carried by the user; and referencing data from the personal device with data from personal devices carried by known users.

15. The method of claim 11, wherein: the method further includes: determining that the identity of the user matches a known identity stored in memory; and selectively recalling a first set of adjustments corresponding to the known identity; and automatically adjusting the component includes automatically adjusting the component to achieve the first set of adjustments.

16. The method of claim 15, further including: determining that the identity of the user does not match the known identity; determining biometrics of the user; determining a second set of adjustments to accommodate the biometrics of the user; and automatically adjusting the component to achieve the second set of adjustments.

17. The method of claim 16, wherein: the component includes at least one of the seat and a steering wheel; and the method further includes: receiving input from the user indicative of a refinement to the first or second sets of adjustments after entry of the user into the vehicle; and adjusting the component to achieve the refinement.

18. The method of claim 17, further including: determining, based on known biometrics of the user, if the refinement is acceptable; and selectively generating a warning indicating that the user should modify the refinement.

19. The method of claim 18, further including measuring a distance from the user to at least one of the component and the airbag, wherein determining if the refinement is acceptable includes determining if the refinement is acceptable based on the distance.

20. A vehicle, including:

a seat;

a steering wheel;

an airbag;

an exterior sensor configured to generate a signal indicative of an identity of a user before entry of the user into the vehicle;

an interior sensor configured to measure at least one of a distance between an occupant and the airbag and the occupant and the seat;

and a controller in communication with the seat, the steering wheel, the airbag, the exterior sensor, and the interior sensor, the controller being configured to:

determine, based on the signal, that the identity of the user matches a known identity stored in memory;

selectively recall a first set of adjustments corresponding to the known identity;

determine, based on the signal, biometrics of the user when the identity of the user does not match the known identity;

determine a second set of adjustments to accommodate the biometrics of the user;

automatically adjust an elevation and an angle of the seat to achieve the first or second sets of adjustments; and automatically adjust a setting of the airbag based on the adjusted elevation and angle of the seat, wherein measuring the distance between an occupant and the airbag comprises determining an angle between a first direct line between the interior sensor and the user and a second direct line between the airbag and the user; and determining the distance between the airbag and the user using the angle between the first direct line and the second direct line; and wherein the setting of the airbag is adjusted further based on the distance between the airbag and the user.

* * * * *